United States Patent
Flaibani et al.

(10) Patent No.: US 11,637,490 B2
(45) Date of Patent: Apr. 25, 2023

(54) PEAK DETECTION FOR CURRENT MODE CONTROL IN A POWER CONVERTER SYSTEM

(71) Applicant: Infineon Technologies AG, Neubiberg (DE)

(72) Inventors: Marco Flaibani, Montegrotto Terme (IT); Davide Dal Bianco, Schio (IT); Giuseppe Loccia, Maenza (IT); Tommaso Pieretti, Padua (IT); Winand Van Sloten, Padua (IT)

(73) Assignee: Infineon Technologies AG, Neubiberg (DE)

( * ) Notice: Subject to any disclaimer, the term of this patent is extended or adjusted under 35 U.S.C. 154(b) by 37 days.

(21) Appl. No.: 17/352,939

(22) Filed: Jun. 21, 2021

(65) Prior Publication Data

US 2022/0407417 A1    Dec. 22, 2022

(51) Int. Cl.
*H02M 3/158*    (2006.01)
*H02M 1/00*    (2006.01)
*H02M 1/08*    (2006.01)

(52) U.S. Cl.
CPC ........... *H02M 1/0025* (2021.05); *H02M 1/08* (2013.01); *H02M 3/158* (2013.01); *H02M 1/0032* (2021.05)

(58) Field of Classification Search
CPC ............ H02M 1/0003; H02M 1/0009; H02M 1/0025; H02M 1/0032; H02M 1/0035; H02M 1/08
See application file for complete search history.

(56) References Cited

U.S. PATENT DOCUMENTS

| | | | |
|---|---|---|---|
| 6,366,070 B1 * | 4/2002 | Cooke | H02M 3/1588 323/284 |
| 8,810,227 B2 | 8/2014 | Flaibani et al. | |
| 9,876,429 B1 | 1/2018 | Bolus et al. | |

(Continued)

FOREIGN PATENT DOCUMENTS

| EP | 2985900 A1 | 2/2016 |
|---|---|---|
| WO | 2010002906 A2 | 1/2010 |

OTHER PUBLICATIONS

U.S. Appl. No. 17/241,669, filed Apr. 27, 2021, naming inventors Scandola et al.

(Continued)

*Primary Examiner* — Alex Torres-Rivera
(74) *Attorney, Agent, or Firm* — Shumaker & Sieffert, P.A.

(57) ABSTRACT

In some examples, a device for controlling a transistor in a power converter system includes a first circuit configured to generate an error current based on a difference between a reference signal and a feedback signal, where the feedback signal depends on an output voltage of the power converter system. The device also includes a frequency generator configured to generate an activation signal based on the difference between the reference signal and the feedback signal. The device further includes a pedestal circuit configured to define a peak current threshold for the transistor based on an offset value. The device also includes a logic circuit configured to activate the transistor based on the activation signal and deactivate the transistor when a current sense signal reaches the defined peak current threshold, where the current sense signal is representative of a power current conducted by the transistor.

20 Claims, 10 Drawing Sheets

(56) References Cited

U.S. PATENT DOCUMENTS

| | | | |
|---|---|---|---|
| 10,389,248 B1 | 8/2019 | Park et al. | |
| 2006/0125454 A1* | 6/2006 | Chen | H02M 3/1588 323/282 |
| 2007/0145965 A1 | 6/2007 | Oswald et al. | |
| 2012/0217946 A1 | 8/2012 | Ju | |
| 2013/0207629 A1* | 8/2013 | Engelhardt | H02M 3/156 323/282 |
| 2016/0049859 A1* | 2/2016 | de Cremoux | H02M 3/1588 323/282 |
| 2017/0187284 A1 | 6/2017 | Vaidya et al. | |
| 2019/0305679 A1* | 10/2019 | Jiang | H02M 3/158 |
| 2021/0218343 A1* | 7/2021 | Matei | H02M 3/158 |

OTHER PUBLICATIONS

U.S. Appl. No. 17/028,348, filed Sep. 22, 2020, naming inventors Dal Bianco et al.

* cited by examiner

PEAK DETECTION FOR CURRENT MODE CONTROL IN A POWER CONVERTER SYSTEM

TECHNICAL FIELD

This disclosure relates to power electronics, and more specifically to power converter systems and devices that operate in power converter systems.

BACKGROUND

In many systems, power converters are used to control voltage and/or current levels withing the system. Power converters may comprise buck converters, boost converters, buck/boost converters, or other types. Some buck converters, for example, may comprise an LC circuit that is connected to a switch node, where the switch node is positioned between a high-side power switch and a low-side power switch. The high-side and low-side power switches are controlled by driver circuits via modulation control signals, such as pulse width modulation (PWM) signals, pulse frequency modulation (PFM) signals, pulse duration modulation signals, pulse density modulation signals, or another type of modulation control signal.

In particular, a controller or a gate driver can deliver modulation control signals to the gates of the high-side and low-side power switches to control the on/off switching of the power switches. In some examples, logic in the controller delivers control signals to the driver(s), and the driver(s) generate and deliver higher-power driving signals to the control terminals of the power switches. By controlling the on/off switching of the power switches, the controller can effectively control the delivery of power to the switch node that is located between the high-side switch and the low-side switch that form a half bridge. In this way, by controlling the high-side and low-side switches of a DC/DC converter, the controller can cause a desired level of current and voltage to be output from the DC/DC converter in order to provide power to a load or another component of the system.

SUMMARY

This disclosure describes techniques for defining a peak current threshold for a power converter system. A controller may be configured to deactivate a switch in a power converter system (e.g., via a driver) when the current through the switch reaches the peak current threshold. The controller can define the peak current threshold using an offset value provided by a pedestal circuit. The techniques of this disclosure may allow for increased efficiencies where the power converter system is in a low current consumption mode. The techniques of this disclosure may also allow for reduced output noise.

In some examples, a device for controlling a transistor in a power converter system includes a first circuit configured to generate an error current based on a difference between a reference signal and a feedback signal, where the feedback signal depends on an output voltage of the power converter system. The device also includes a frequency generator configured to generate an activation signal based on the difference between the reference signal and the feedback signal. The device further includes a pedestal circuit configured to define a peak current threshold for the transistor based on an offset value. The device also includes a logic circuit configured to activate the transistor based on the activation signal and deactivate the transistor when a current sense signal reaches the defined peak current threshold, where the current sense signal is representative of a power current conducted by the transistor.

In some examples, a power converter system includes a transistor, a driver configured to activate or deactivate the transistor, and a controller including a first circuit configured to generate an error current based on a difference between a reference signal and a feedback signal. The feedback signal depends on an output voltage of the power converter system. The controller also includes a frequency generator configured to generate an activation signal based on the difference between the reference signal and the feedback signal. The controller further includes a pedestal circuit configured to define a peak current threshold for the transistor based on an offset value. The controller also includes a logic circuit configured to cause the driver to activate the transistor based on the activation signal and cause the driver to deactivate the transistor when a current sense signal reaches the defined peak current threshold, wherein the current sense signal is representative of a power current conducted by the transistor.

In some examples, a method for controlling a transistor in a power converter system includes generating, by an amplifier of a controller, an error current based on a difference between a reference signal and a feedback signal, wherein the feedback signal depends on an output voltage of the power converter system. The method includes generating, by a frequency generator of the controller, an activation signal based on the difference between the reference signal and the feedback signal. The method also includes defining, by a pedestal circuit of the controller, a peak current threshold for the transistor based on an offset value. The method further includes activating, by a logic circuit of the controller, the transistor based on the activation signal. The method includes deactivating, by the logic circuit, the transistor when a current sense signal reaches the defined peak current threshold, wherein the current sense signal is representative of a power current conducted by the transistor.

The details of one or more examples are set forth in the accompanying drawings and the description below. Other features, objects, and advantages will be apparent from the description and drawings, and from the claims.

DETAILED DESCRIPTION

This disclosure describes devices, methods, and techniques for controlling a power converter system using current mode control. A controller for a power converter system (e.g., a switched mode power supply) may be configured to smoothly transition from pulse-frequency modulation (PFM) operation at lower output currents to pulse-width modulation (PWM) operation at higher output currents. In some examples, a frequency generator such as a voltage controlled oscillator (VCO) coupled to the output of an error amplifier may be configured to generate a clock signal from which the controller can derive a control signal for a switch in the power converter system.

The voltage-to-frequency transfer function may be linear up until the frequency generator reaches a maximum frequency or until a designated error voltage is detected, at which point the frequency generator may be configured to operate at the maximum frequency. During operation, the controller may be configured to operate in PWM mode by modulating the duty cycle of the control signal while the system is operating at the maximum frequency of the frequency generator. When the frequency generator is operating below the maximum frequency, the controller may be configured to generate a PFM signal for the switch driver.

The controller may also utilize a control loop for generating a deactivation signal. This control loop may include a peak detection comparator for triggering the deactivation signal based on an error current, a current sense signal, and a pedestal current. The pedestal current may be configured to provide an offset value that defines a peak current threshold for the power converter system. The use of a pedestal current may allow for higher efficiency in the power converter system, especially in low-current modes.

Figure 1:
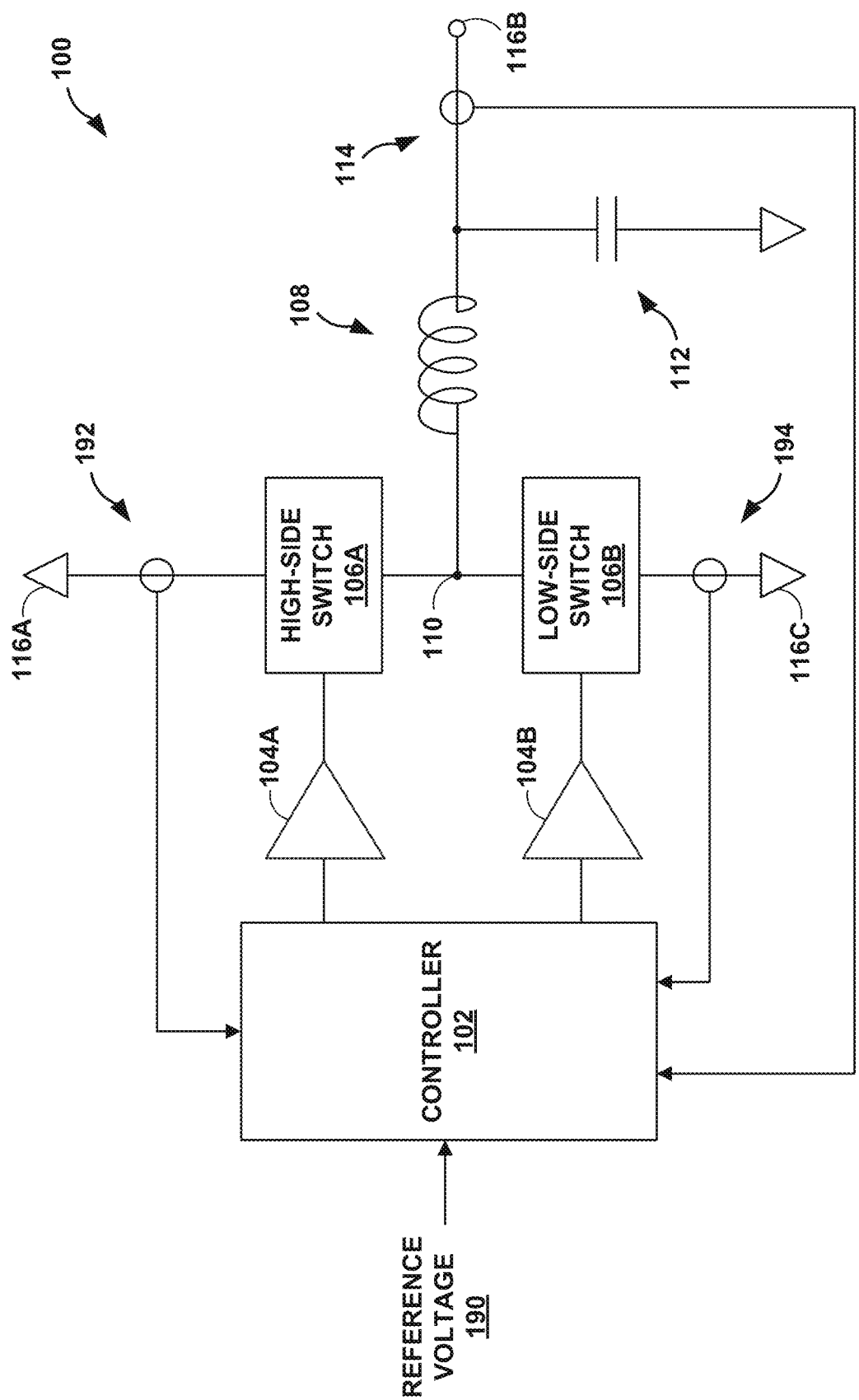
FIG. 1 is a block and circuit diagram of an example power converter system, in accordance with the techniques of this disclosure.

FIG. 1 is a block and circuit diagram of an example power converter system 100, in accordance with the techniques of this disclosure. FIG. 1 illustrates embodiment power converter system 100 producing a regulated voltage at output node 116B from the input voltage at node 116A. In some examples, power converter system 100 may be part of an or vehicle automotive system, e.g., an engine control system or another system within an automobile or other vehicle. The input voltage level at node 116A may be in a range between ten and fifteen volts, and power converter system 100 may be configured to regulate the output voltage at output node 116B to approximately five volts. The techniques of this disclosure may also apply to systems using other input voltages and regulated voltages.

In the example shown in FIG. 1, power converter system 100 is configured as a buck converter that includes switch 106A coupled to switch 106B and inductor 108 at node 110. Each of switches 106A and 106B may include a freewheeling diode that is coupled in parallel with the respective switch. In some examples, a diode can be used as an alternative to low-side switch 106B to allow current to flow from reference node 116C. Each of these diodes may have an anode oriented towards node 116C and a cathode oriented towards node 116A.

Drivers 104A and 104B may be configured to drive switches 106A and 106B. Each of drivers 104A and 104B may be standalone components, drivers 104A and 104B may be combined into a single device, driver 104A may be integrated into the same device as switch 106A, and/or driver 104A may be integrated into controller 102. Each of switches 106A and 106B may comprise an N-type metal-oxide-semiconductor (MOS) device, a P-type MOS device, a bipolar junction transistor device, a junction field effect transistor (FET) device, a MOSFET device, an insulated-gate bipolar transistor device, or another device type. Switches 106A and 106B may comprise semiconductor material such as silicon, germanium, silicon carbide, and/or gallium nitride. In some examples, each of switches 106A and 106B may include a plurality of transistors connected in parallel.

During operation, controller 102 may be configured to generate and deliver pulse-width modulated (PWM) or pulse frequency modulated (PFM) signals to drivers 104A and 104B, and drivers 104A and 104B may generate gate signals (e.g., driving signals) to control the ON/OFF (e.g., activation/deactivation) state of switches 106A and 106B based on the PWM or PFM signals. In this way, controller 102 may be configured to control switches 106A and 106B to couple and decouple node 110 to node 116A or 116C. When switch 106A is activated and switch 106B is deactivated, current flows from node 116A though node 110 and inductor 108 to charge capacitor 112. When switch 106A is deactivated and switch 106B is activated, current continues to flow through the inductor 108 from node 116C via switch 106B.

In examples in which power converter system 100 operates in a discontinuous conduction mode (DCM), capacitor 112 discharges via current sense element 114 and/or via a load coupled to node 116B after energy stored in inductor 108 has dissipated. Inductor 108 may have an inductance in a range between approximately two and one hundred microhenries, switch 106A may be capable of conducting currents in a range between approximately one to four amperes, capacitor 112 may have a capacitance in a range between approximately ten microfarads and one millifarad, and power converter system 100 may be configured to operate at a switching frequency of between approximately one hundred kilohertz and three megahertz. The techniques of this disclosure may also apply to systems having different ranges for inductance, current rating, capacitance, and switching frequency, including values outside of the stated ranges.

The buck converter illustrated in FIG. 1 is just one example of a power converter system topology for implementing the techniques of this disclosure. Other possible converter topologies include, but are not limited to, boost converters, buck-boost, single-ended primary-inductor converter, and Cuk converters. Other possible topologies can use one or more transformers instead of an inductor or use both one or more inductors and one or more transformers.

Node 116B may be coupled to sensor 114, which may include a resistor divider, a capacitive divider, a current mirror, a magnetoresistive sensor, and/or any other type of sensor. Controller 102 may be configured to adjust the duty cycle of the control signals delivered to drivers 104A and 104B according to the voltage detected at by sensor 114. Controller 102 may be configured to generate the control signals according to this feedback voltage and according to a current sensed by sensor 192 and/or 194 such that the output voltage at output node 116B is regulated to approximately a predetermined voltage. Controller 102 may be configured to regulate the voltage at node 116B to reference voltage 190 or a multiple or fraction of reference voltage 190.

Controller 102 may be formed on a single integrated circuit. In some examples, driver 104, switches 106A and 106B, inductor 108, and/or capacitor 112 can also be included on the same integrated circuit. Sensor 192 may be coupled between reference node 116A and switch 106A, and sensor 194 may be coupled between reference node 116C and switch 106B. Sensor 194 may be used for DCM, overload protection, and other functions. Sensor 192 and/or 194 may include a shunt resistor, a current sensing transistor, a magnetoresistive sensor element, or any other sensor configured to sense a current from node 116A to an input of switch 106A. Although FIG. 1 depicts sensors 192 and 194 as delivering a single-ended signal to controller 102, sensor 192 and/or 194 may be configured to deliver a differential signal to controller 102 in some examples. Sensor 192 or 194 can be positioned in other locations within power converter system 100 such as in series with inductor 108.

In some implementation, the current consumption of power converter system 100 can be an important consideration, even if the load (e.g., engine control unit) is not completely switched off, but only in standby. In such a case, the maximum current consumption from the engine control unit should be kept low (e.g., approximately two milliamperes) even if the current consumption of controller 102 is higher (e.g., up to three milliamperes). The current consumption at the input of power converter system 100 can be reduced to increase the efficiency at low current levels. For example, an efficiency of greater than seventy percent with an output current in a range from one to three milliamperes, an input voltage of 13.5 volts, and an output voltage of 3.3 volts.

The goal of reducing the output noise may be at odds with the goal of increasing the efficiency of power converter system 100. A reduction in output noise could trigger a spurious event or a malfunction in the power converter system 100. A target amplitude for the peak-to-peak ripple voltage at the output is thirty-three millivolts, or less than one-half percent of the target output voltage. The techniques of this disclosure can offer better efficiency by monitoring the high-side current and activating the high-side switch until a desired current peak is reached, while using variable frequency in some operating modes.

Power losses in a low current regime can be caused by switching losses and driving losses. A way to reduce these losses is to reduce the switching frequency. The only way to reduce the switching frequency, while maintaining the output voltage, is to increase the on-time of the high-side switch, which increases the energy transferred to the output. This increase in energy can be performed in a controlled fashion to avoid too high of a voltage ripple at the output node.

Table I is the output of a model where the on-time was modulated and the impact on the efficiency is visible. Each row is a different on-time for high-side switch 106A, and each column is a different output current of power converter system 100. The input voltage used for Table I is 13.5 volts). Table I shows that increasing the on-time increases higher efficiency. A large part of the losses may still be linked to the internal consumption of controller 102.

Figure 2:
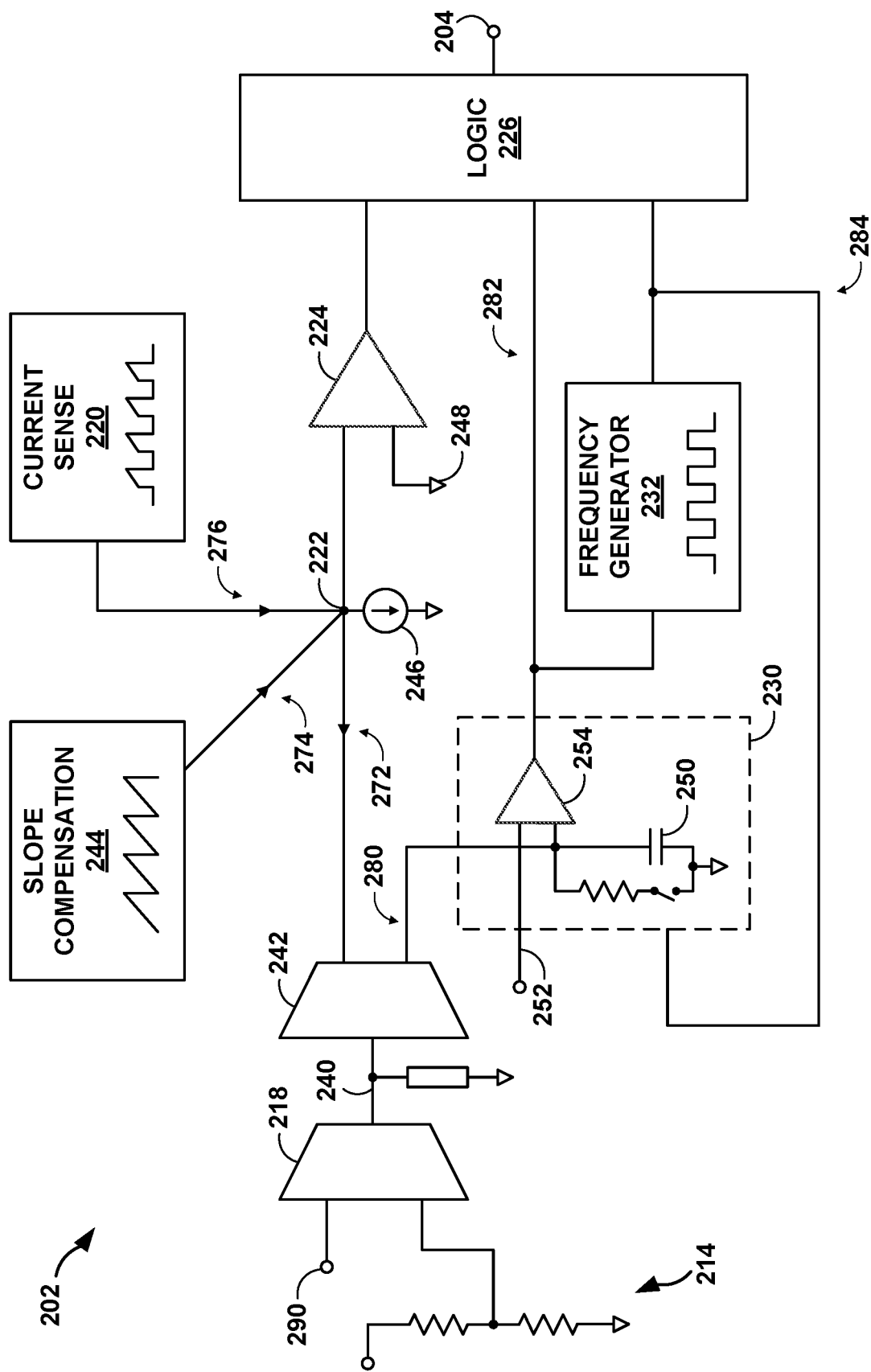
FIG. 2 is a block and circuit diagram of an example controller for a power converter system, in accordance with the techniques of this disclosure.

FIG. 2 is a block and circuit diagram of an example controller 202 for a power converter system, in accordance with the techniques of this disclosure. In an embodiment, controller 202 produces a pulse modulated signal at node 204 based on a difference between reference voltage 290 and the feedback voltage received from sensor 214. FIG. 2 depicts sensor 214 as a resistive divider, but other types of sensors may be used to deliver a feedback signal to error amplifier 218. The feedback signal generated by sensor 214 may represent the output voltage of a power converter system.

Error amplifier 218 may be configured to amplify a difference between reference voltage 290 and the feedback voltage received from sensor 214. Error amplifier 218 may generate and deliver compensation voltage 240 to amplifier 242. Amplifier 242 may be configured to convert compensation voltage 240 to error current 272, which is also referred to herein as i_gm2. Amplifier 242 may include a transconductance amplifier configured to generate error current 272 with zero amplitude when compensation voltage 240 is less than a threshold level (e.g., threshold voltages 730A and 730B shown in FIGS. 7A and 7B). Generating error current 272 with zero amplitude may result in minimum on-time for the high-side switch. Additional example details of amplifiers 218 and 242 are described in commonly assigned U.S. Pat. No. 8,810,227, entitled "System and Method for Controlling a Switched-Mode Power Supply," issued on Aug. 19, 2014, the entire contents of which are incorporated herein by reference.

In FIG. 2, controller 202 is shown as including a top control loop and a bottom control loop. The top control loop may operate similar to a current mode direct current/direct current (DC/DC) converter operating in a PWM mode. The top control loop includes current sense circuit 220, node 222, peak detection comparator 224, slope compensation circuit 244, and pedestal circuit 246. The bottom control loop may implement a current model approach through frequency generation. The bottom control loop includes ramp circuit 230 and frequency generator 232. Frequency generator 232 may be configured to reduce the frequency in examples in which compensation voltage 240 is low.

Frequency generator 232 may be configured to adjust the frequency of clock signal 284 by adjusting the frequency of the clock pulses. Additionally or alternatively, frequency generator 232 may be configured to reduce the frequency of clock signal 284 by skipping one or more pulses of clock signal 284. Frequency generator 232 may use this skip technique by skipping M out of N clock pulses, where N is an integer greater than one, and M is an integer between zero and N minus one. Skipping clock pulses may result in a reduced effective frequency for clock signal 284.

For the top control loop, at node 222, controller 202 may be configured to sum and/or subtract currents 272, 274, and 276 outputted by amplifier 242, slope compensation circuit 244, and current sense circuit 220, and the current outputted by pedestal circuit 246. Peak detection comparator 224 may

TABLE I

Efficiency of power converter system 100 based on on-time and load current

| on-time | 300 µA | 1 mA | 3 mA | 7 mA | 10 mA | 30 mA | 100 mA | 300 mA |
|---------|--------|--------|--------|--------|--------|--------|--------|--------|
| 225 ns  | 0.5758 | 0.7235 | 0.8145 | 0.8438 | 0.8554 | 0.8649 | 0.8631 | 0.8728 |
| 200 ns  | 0.5238 | 0.7176 | 0.8015 | 0.8225 | 0.8339 | 0.8428 | 0.8402 | 0.8606 |
| 175 ns  | 0.5126 | 0.699  | 0.7739 | 0.7972 | 0.8053 | 0.8123 | 0.8127 | 0.8501 | be configured to receive, at a first input node, an output signal from node 222 and, at a second input node, a signal from a reference current or voltage source. Peak detection comparator 224 may include a current comparator configured to compare the currents at the two input nodes and output a signal based on the comparison. For example, peak detection comparator 224 may be configured to cause logic circuit 226 to deactivate the high-side switch (e.g., via a driver) when current sense signal 276 reaches, crosses, or satisfies a peak threshold defined by the pedestal current and error current 272.

The output node of peak detection comparator 224 may be coupled to logic circuit 226. In some examples, logic circuit 226 may include a latch circuit, and the output node of peak detection comparator 224 may be coupled to the reset input of the latch circuit. The circuits and blocks depicted in controller 202 may be functional in nature and can be implemented in a variety of ways. For example, error amplifier 218 and current sense circuit 220 can be implemented using transconductance amplifiers, and node 222 can be implemented using one or more current summing nodes.

Pedestal circuit 246 may be configured to deliver a so-called "pedestal current," which can adjust error current 242 outputted by amplifier 242 to improve operation of the top control loop. In some examples, pedestal circuit 246 is configured to generate a fixed or constant current, although one or more of the components of pedestal circuit 246 may be trimmable or adjustable. The fixed pedestal current may be less than one milliampere or less than one hundred microamperes. Pedestal circuit 246 may be configured to act as a current sink for node 222, where amplifier 242 may be configured to generate error current with the same polarity as the pedestal current. Slope compensation circuit 244 and current sense circuit 220 may be configured to generate currents 274 and 276, each with a polarity that is opposite to the pedestal current and error current 272. Thus, slope compensation circuit 244 and current sense circuit 220 may be configured to push currents 274 and 276 to node 222, and amplifier 242 and pedestal circuit 246 may be configured to pull or sink currents from node 222.

The introduction of the pedestal current may not be the same as an adjustment of the internal threshold(s) of amplifier 242 when compensation voltage 240 is greater than a threshold voltage of amplifier 242. Even when compensation voltage 240 is less than the internal threshold voltage, and error current 272 equals zero, current sense signal 276 may still have to overcome the pedestal current to cause peak detection comparator 224 and logic circuit 226 to deactivate the high-side switch (e.g., via a driver). Thus, pedestal circuit 246 may be configured to fix the minimum peak current in all operating conditions. Defining an offset value for the peak current may improve the efficiency of the system by increasing the minimum on-time of the high-side switch.

Slope compensator circuit 244 may be configured to provide measurement compensation for an upward slope in current over time. Slope compensator circuit 244 can generate slope compensation signal 274 to reduce the harmonic oscillation that could be triggered for duty cycles greater than fifty percent.

Peak detection comparator 224 may be configured to compare the sum of currents at node 222 to a current from reference current source 248. The algebraic sum of the currents received at node 222 from amplifier 242, slope compensation circuit 244, and pedestal circuit 246 may define a dynamic current threshold for the current outputted by current sense 220. Additional example details of peak detection are described in commonly assigned U.S. patent application Ser. No. 17/241,669, entitled "Dynamic Current Detection Loops for Multiphase Power Converter," filed on Apr. 27, 2021, the entire contents of which are incorporated herein by reference.

For the bottom control loop, an output node of amplifier 242 is further coupled to ramp circuit 230. The outputs of ramp circuit 230 and frequency generator 232 may be coupled to logic circuit 226, such as to the set input of a latch circuit in logic circuit 226. In some examples, the frequency of the bottom control loop is linearly related to the output of error amplifier 218 and amplifier 242 over a certain range of inputs, above which the frequency is limited to a maximum frequency. Amplifier 242 may include internal thresholds that are set so that controller 202 is configured to first reduce the on-time to a minimum duration (e.g., PWM) and after reduce the switching frequency (e.g., PFM). Amplifier 242 can cause these operations through ramp signal 280 and frequency generator 232.

FIG. 2 represents the bottom control loop functionally on a system level by showing ramp circuit 230 in series with frequency generator 232, which may include a clock manager such as a VCO or a ramp generator. The bottom control loop can be implemented in a variety of ways to achieve the voltage-frequency characteristic represented by ramp circuit 230 and frequency generator 232. For example, the voltage-frequency characteristic may exhibit a hard-limiting characteristic, a soft limiting characteristic, and/or a non-linear voltage-frequency transfer characteristic.

Amplifier 242 may be configured to charge capacitor 250 of ramp circuit 230 with a current proportional to compensation voltage 240. If the voltage signal received by error amplifier 218 from sensor 214 is less than reference voltage 290, amplifier 242 may be configured to refrain from charging capacitor 250. On the other hand, when the voltage signal received by error amplifier 218 from sensor 214 is greater than reference voltage 290, amplifier 242 may be configured to charge capacitor 250, thereby causing a voltage increase at a first input node of comparator 254.

When the voltage at the first input node of comparator 254 crosses the threshold of comparator 254 (e.g., reference voltage 252), comparator 254 may be configured to output hold signal 282 to logic circuit 226 and to frequency generator 232. In other words, the value of the output of ramp circuit 230 may be configured to switch in response to ramp signal 280 crossing the threshold. Frequency generator 232 may be configured to release clock signal 284 in response to a change in the value of hold signal 282. Ramp circuit 230 may be configured to reset by discharging capacitor 250 to a low-impedance node in response to the signal outputted by frequency generator 232. Clock signal 284 outputted by frequency generator 232 may be referred to herein as ton_min or a minimum time signal. After ramp circuit 230 is reset, ramp circuit 230 can start a new charging phase.

Logic circuit 226 may be configured to cause a driver to activate the transistor of the power converter system based on hold signal 282 and clock signal 284. Logic circuit 226 may be configured to wait for the later arrival of hold signal 282 and clock signal 284 to cause the driver to activate the transistor. Stated another way, if hold signal 282 switches value before the arrival of a transition in clock signal 284, then logic circuit 226 may be configured to wait for the transition in clock signal 284 to trigger the activation signal. If a transition in clock signal 284 arrives before a switch in the value of hold signal 282, then logic circuit 226 may be configured to wait for the switch in the value of hold signal 282 to trigger the activation signal.

As stated above, logic circuit 226 may include a latch circuit having a set input coupled to the bottom control loop and a reset input coupled to the top control loop. However, the set and reset inputs of the latch circuit may be reversed so that the set input of the latch circuit is coupled to the output of peak detection comparator 224, and the reset input of the latch circuit is coupled to the output of the frequency generator 232. In such an example, controller 202 may be configured to operate in a valley current mode based on a signal received from a low-side current sensor (e.g., sensor 194 shown in FIG. 1).

The range of operation of controller 202 may be affected by the materials and components used within power converter system, the input and output voltages, the threshold voltages for amplifiers 218 and 242, and/or the gain parameter for amplifier 242. Controller 202 may be configured to operate in PFM DCM in examples where compensation voltage 240 is less than or greater than a threshold voltage of amplifier 242. Controller 202 may be configured to operate in PFM continuous conduction mode (CCM) in examples where compensation voltage 240 is greater than the threshold voltage of amplifier 242 and in examples where controller 202 is operating at the minimum on-time.

Controller 202 may include additional circuitry not shown in FIG. 2 that is configured to shut down some parts of the power converter system in order to reduce the overall current consumption of the power converter system. For example, the additional circuitry of controller 202 may be configured to shut down some portions of the power converter system besides error amplifier 218 and frequency generator 232 between PFM output pulses. The additional circuitry may be configured to deactivate the internal circuitry of controller 202 after a timeout from the last activation of high-side switch. Frequency generator 232 may be configured to implement a delay in sending an activation signal to logic circuit 226 when the internal circuitry is being reactivated after a standby mode.

Figure 3:
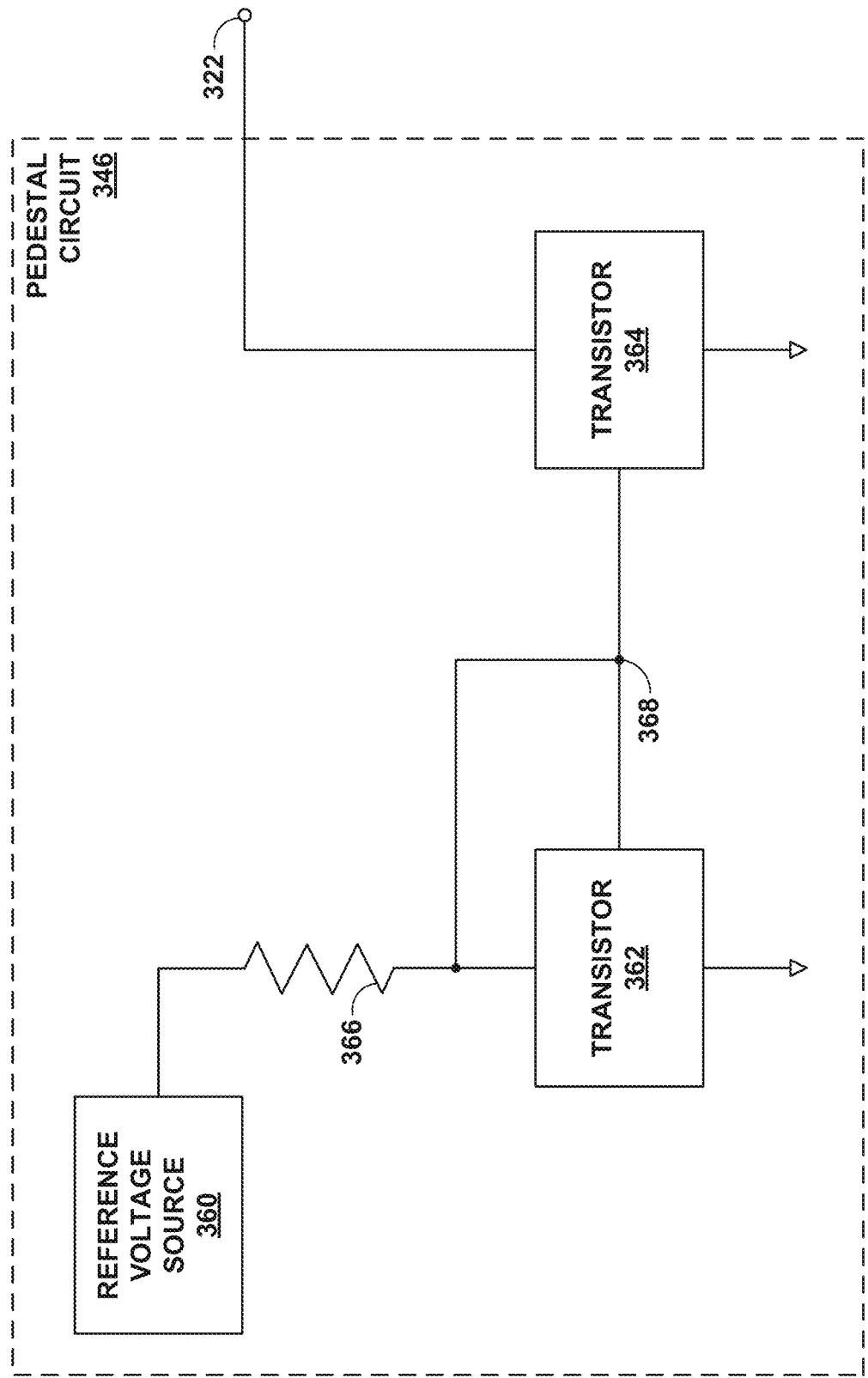
FIG. 3 is a block and circuit diagram of an example pedestal circuit, in accordance with the techniques of this disclosure.

FIG. 3 is a block and circuit diagram of an example pedestal circuit 346, in accordance with this disclosure. Pedestal circuit 346 is shown in FIG. 3 to include transistors 362 and 364 connected as a current mirror. Reference voltage source 360 may be configured to provide an input voltage to the current mirror of pedestal circuit 346. An output node of pedestal circuit 346 may be coupled to node 322, which may be a summing node for current sense, slope compensation, and an output of an amplifier, similar to node 222 shown in FIG. 2. Pedestal circuit 346 may be configured to generate an offset value for the peak current of a power converter system.

The current mirror of pedestal circuit 346 may be configured to produce a constant current for node 322. Resistor 366 may comprise a trimmable or adjustable resistor so that the output of pedestal circuit can be adjusted at the time of manufacture and/or in the field. In this case, resistor 366 can be trimmed to achieve a desirable peak current limit at node 322. In examples in which a low quiescent current is desired, the controller may be configured to deactivate the current generated by pedestal circuit 346 after a certain duration of inactivity (e.g., two microseconds). The duration of inactivity may be measured as the duration since the previous activation of a high-side switch. The controller may be configured to activate pedestal circuit 346 for defining the peak current threshold at the next cycle after inactivity. To define the peak current threshold, the controller may introduce a small delay (e.g., approximately twenty nanoseconds) between the activation of pedestal circuit 346 and activation of the high-side switch. The minimum activation time of the high side switch may be approximately fifty nanoseconds, resulting in a lead time for activating pedestal circuit 346 of approximately seventy nanoseconds before the high-side switch needs to be activated. The frequency generator may be configured to implement a delay in activating the high-side switch when pedestal circuit 346 is being reactivated after a standby mode.

Figure 4:
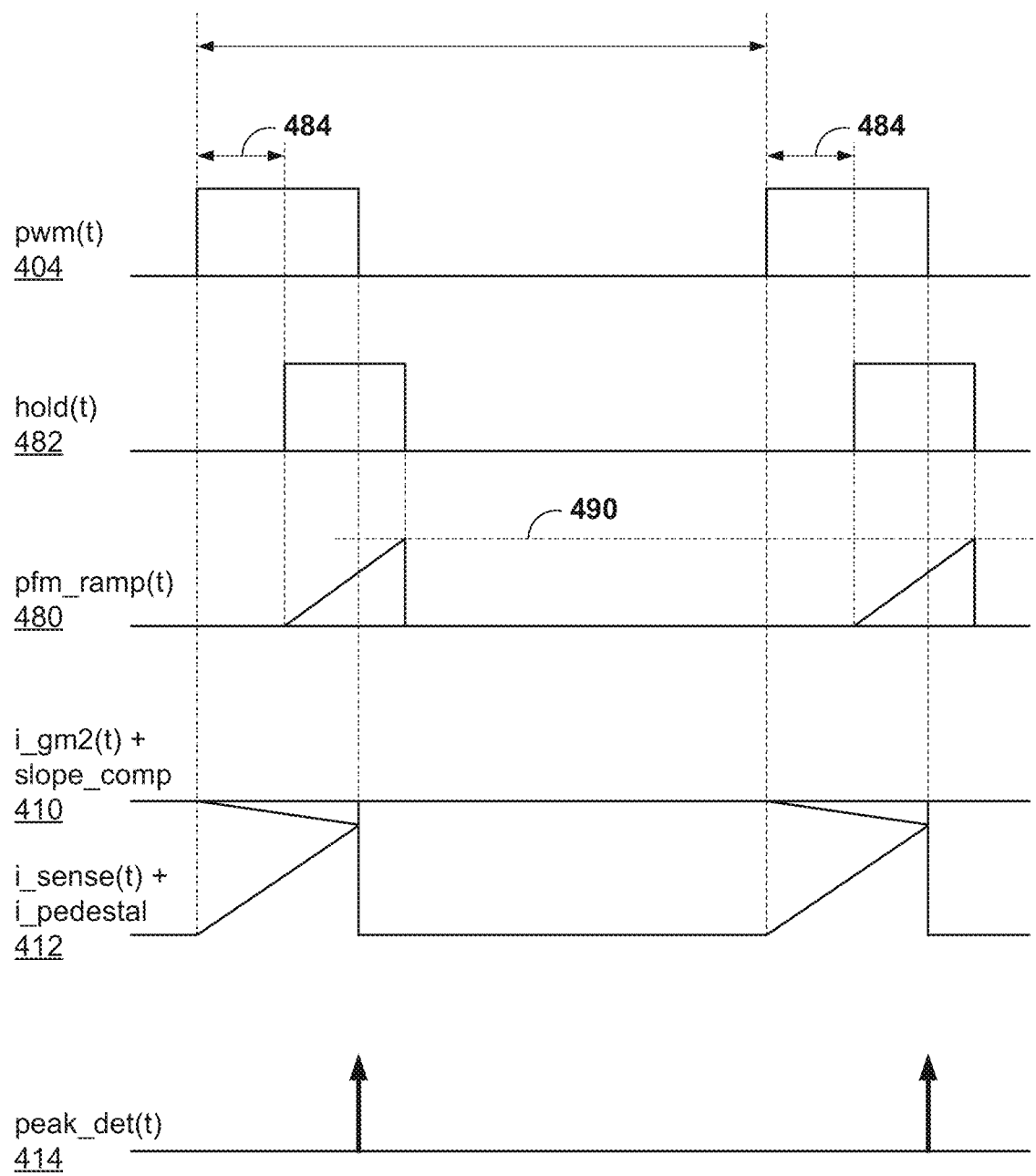
FIGS. 4-6 are timing diagrams for a controller in a power converter system, in accordance with the techniques of this disclosure.
Figure 5:
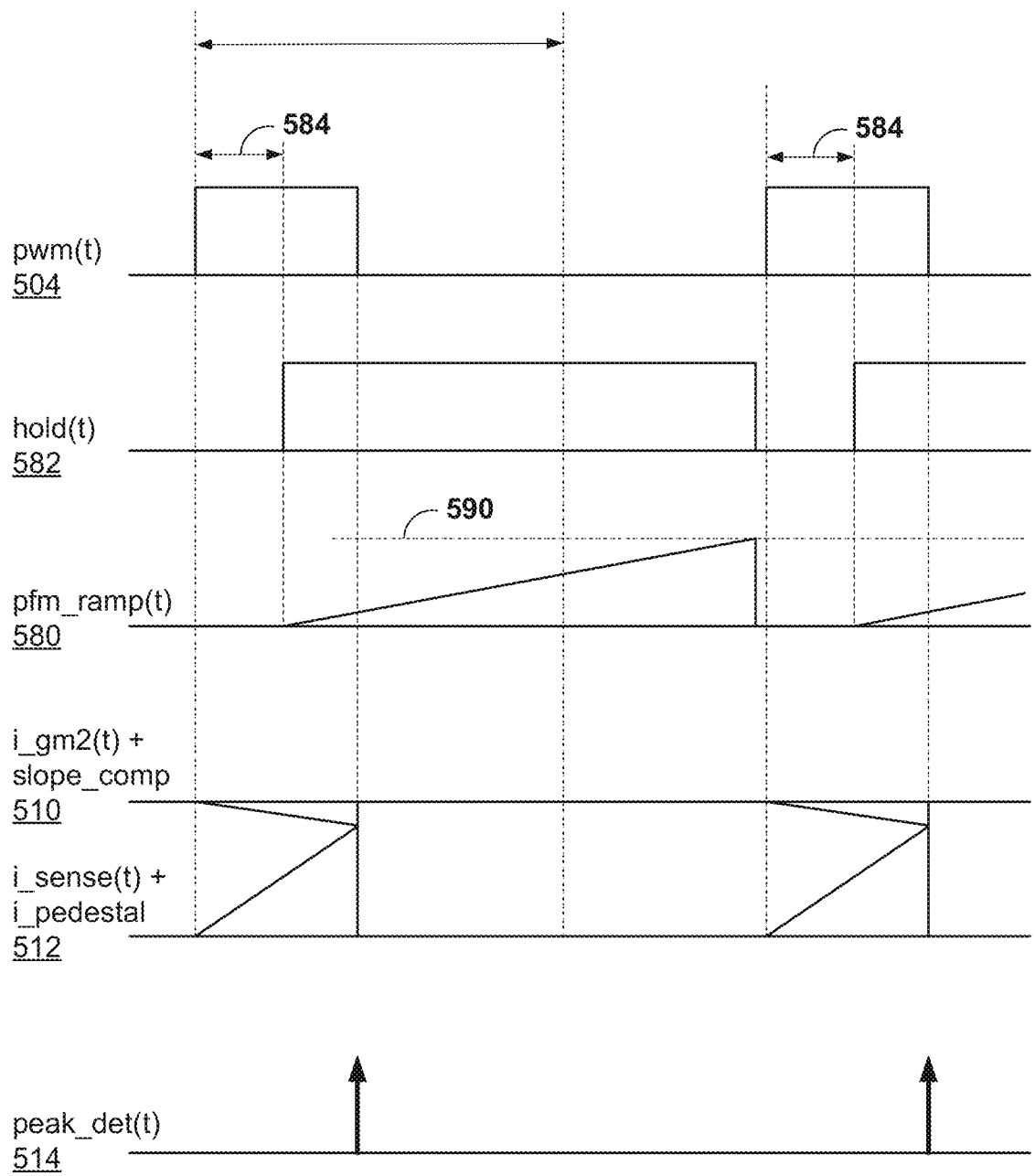
Figure 6:
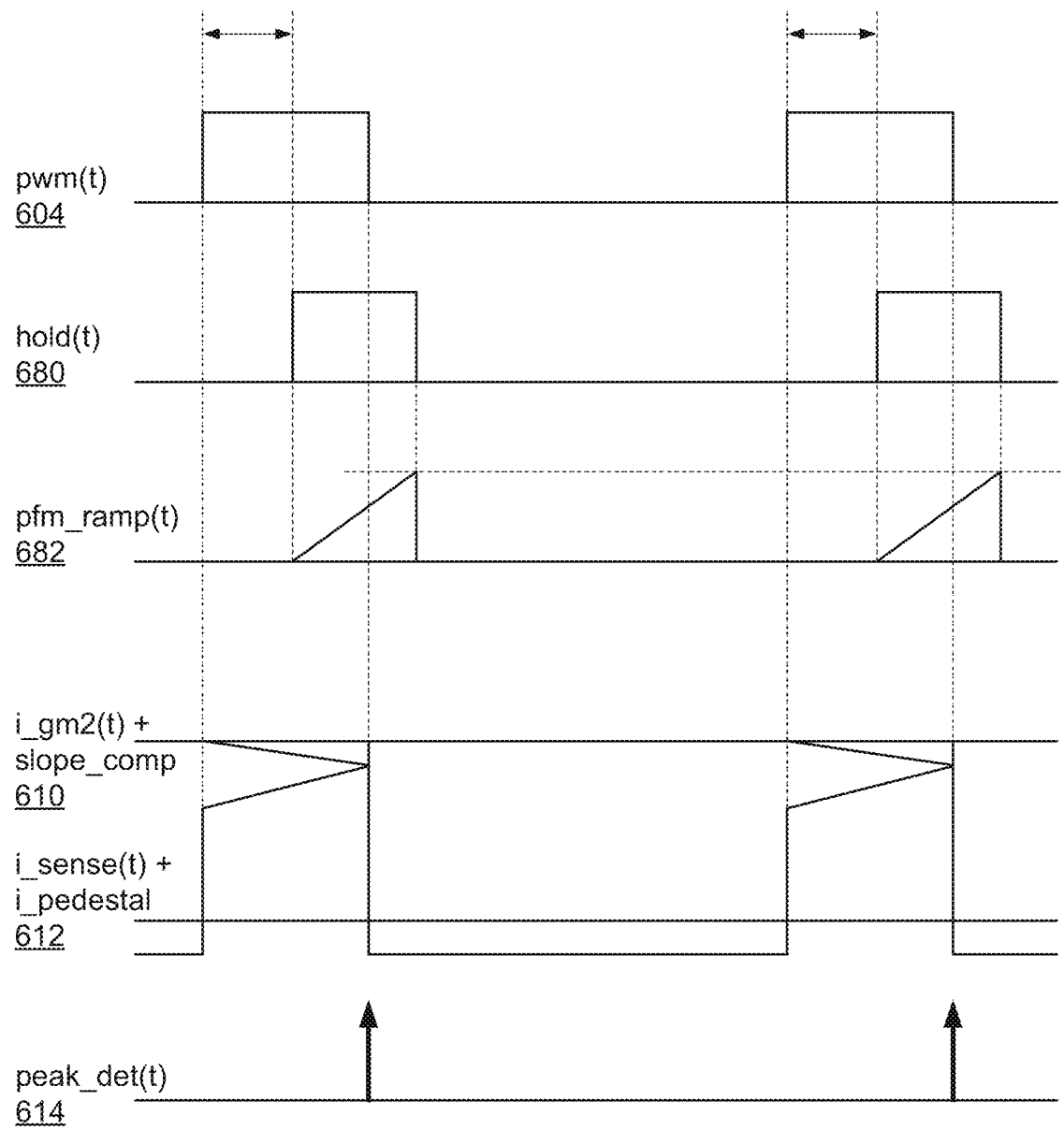

FIGS. 4-6 are timing diagrams for a controller in a power converter system, in accordance with the techniques of this disclosure. FIG. 4 shows an example of operation in a PWM DCM mode where the compensation voltage is less than a threshold voltage for a transconductance amplifier. When the compensation voltage is less than the threshold voltage, the transconductance amplifier may be configured to output the i_gm2 current with an amplitude of zero. The timing diagrams of FIGS. 4-6 are described in the context of controller 202 of FIG. 2, but other components such as controllers 102 and 802 shown in FIGS. 1 and 8 or other types of controllers may implement similar techniques.

PWM signal 404 may represent a control signal generated and delivered by logic circuit 226 to node 204 shown in FIG. 2. A driver may receive the control signal and send a similarly shaped but higher power signal to a transistor. The rising edge of PWM signal 404 is triggered by a clock signal from a frequency generator, and this rising edge of PWM signal 404 can activate the high side switch, when delivered by the driver. The rising edge of PWM signal 404 may also trigger a slope compensation circuit to begin operating. The high side switch may be activated for at least minimum time 484, referred to herein as ton_min. The frequency generator may be configured to generate a clock signal to activate the ramp circuit. Hold signal 482 and the clock signal may be used by the logic circuit as activation signals.

Ramp circuit 230 shown in FIG. 2 may be configured to generate ramp signal 280, an example of which is shown as ramp signal 480 in FIG. 4. As long as ramp signal 480 is less than is threshold level 490, the logic circuit may be configured to not cause the driver to activate the high-side switch to begin another switching cycle. For example, the frequency generator may be configured to refrain from outputting a rising edge of the clock signal to the logic circuit until hold signal 482 has a falling edge. Thus, the clock signal may function as an activation signal. FIG. 4 shows hold signal 482 as a square pulse that ends when ramp signal 480 reaches threshold level 490.

Waveform 410 shows the sum of the slope compensation signal and the error current (e.g., i_gm2), which may be set to zero when the compensation voltage is less than the threshold voltage. The slope compensation signal may ramp up or down in amplitude, depending on the polarity of the signal, after PWM signal 404 starts the slope compensation circuit. The slope compensation signal may be subtracted from i_gm2 where the polarities of these signals are opposite. The difference may be compared to the current sense signal, which is shown in FIG. 2 as current sense signal 276, minus the pedestal current. FIG. 2 also shows the pedestal current acting in parallel to current sense signal 276, but with opposite polarity. As soon as waveform 410 is equal to waveform 412, the peak detection comparator may be configured to output signal 414 to trigger the logic circuit to cause the driver to deactivate the high-side switch and cause the driver to activate the low-side switch (e.g., after a predetermined dead time).

FIG. 5 shows an example of operation in a PFM DCM mode where the compensation voltage is less than the threshold voltage for a transconductance amplifier. FIG. 5 may show the operating mode at a very low current. The error signal outputted by the transconductance amplifier is so low that the switching frequency is reduced. As long as hold signal 582 is high, the logic circuit is inhibited from starting the next clock cycle by activating the high-side switch.

As shown in the timing diagrams of FIG. 5, hold signal 582 begins a square pulse after minimum time 584 has elapsed since the high-side switch was activated. The square pulse of hold signal 582 persists until ramp signal 580 reaches threshold level 590, which may be approximately five hundred millivolts or four hundred and eighty millivolts. The slope of ramp signal 580 may be proportional to the compensation voltage (e.g., error signal) generated by the error amplifier. In examples in which the compensation voltage is very small, the slope of ramp signal 580 may be very low, thereby preventing the logic circuit from activating high-side switch by initiating a rising edge of PWM signal 504.

FIG. 6 shows an example of operation in a PWM CCM where the compensation voltage is greater than the threshold voltage for a transconductance amplifier. The compensation voltage being greater than the threshold voltage is evident because the error current (e.g., i_gm2) is greater than zero. Waveform 612 is less than zero between the pulses of PWM signal 604 because the polarity of the error current is negative with respect to the peak detection comparator. In this operation condition, the behavior may be the same as the "scholastic" peak current mode approach where the PWM high signal is linked to the clock and the PWM low signal is linked to the peak detector condition.

Figure 7A:
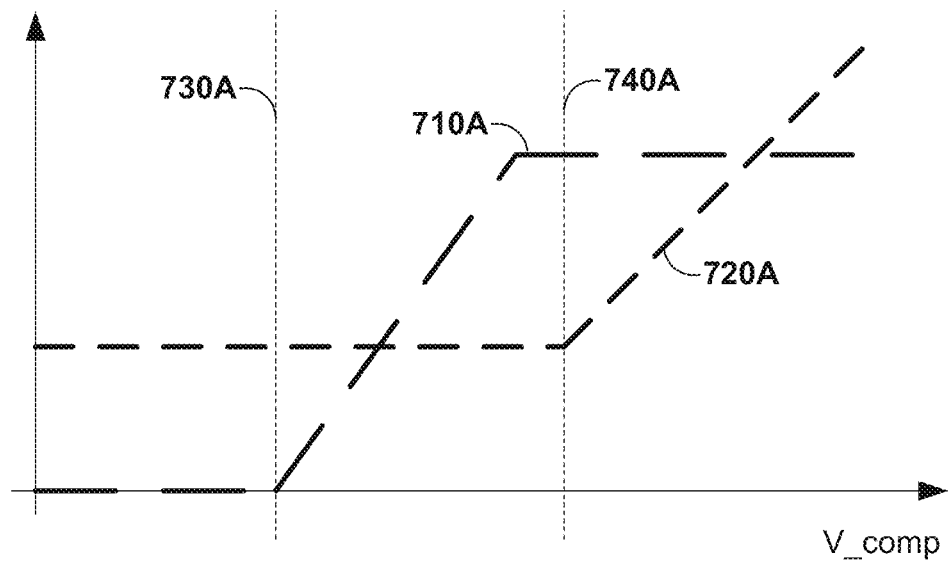
FIGS. 7A and 7B are graphs of switching frequencies and peak current thresholds as a function of a compensation voltage, in accordance with the techniques of this disclosure.
Figure 7B:
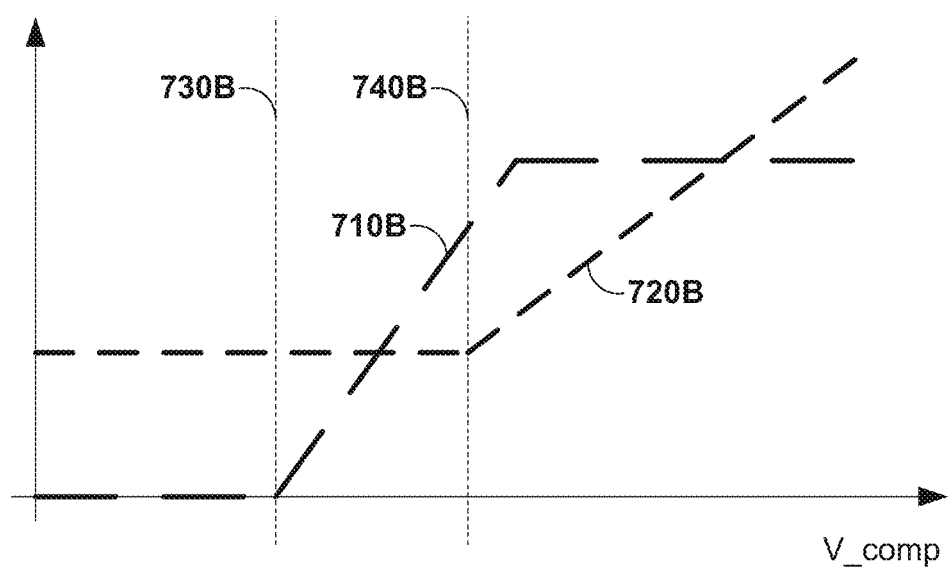

FIGS. 7A and 7B are graphs of switching frequencies and peak current thresholds as a function of a compensation voltage, in accordance with the techniques of this disclosure. FIGS. 7A and 7B provide more detail about the behavior of the controller at different compensation voltages, where compensation voltage is shown on the horizontal axes. In FIG. 7A, threshold voltages 730A and 740A are relatively far apart, and the frequency generator outputs a zero frequency signal or a low-frequency clock signal when the compensation voltage is less than threshold voltage 730A. Switching frequency 710A of the power converter system reaches the maximum frequency at a compensation voltage that is less than threshold level 740A. The controller may be configured to reach the maximum switching frequency and then start to increase peak current value 720A.

In FIG. 7B, threshold voltages 730B and 740B are closer together, as compared to FIG. 7A. The controller may be configured to modulate peak current 720B at compensation voltages that are less than threshold voltage 740B. Thus, peak current 720B may be modulated at compensation voltages where the switching frequency has not reached the maximum frequency value. For compensation voltages that are less than threshold voltage 740A or 740B, the peak current threshold may remain constant.

Many other operating areas are possible, such as DCM or CCM, in PFM or PWM, and with compensation voltages that are less than or greater than threshold voltage 740A or 740B. Thus, there are eight different types of modes. The operating modes may not be independent but may instead be linked with the materials and components used and the internal control parameters (e.g., threshold voltages, transconductance gains, etc.). Each of the operating modes may be linked to the compensation voltage generated by the error amplifier, which is the only regulating variable in some examples. In other words, the frequency of operation and the peak current may both depend on the compensation voltage.

The stability of each mode is often a concern with multi-mode controllers. However, the techniques of this disclosure may simplify the loop compensation where the current loop triggers the frequency generation or the on-time duration the loop behaves as a current loop. For this reason, a doublet of an LC filter is not visible in the transfer function.

Figure 8:
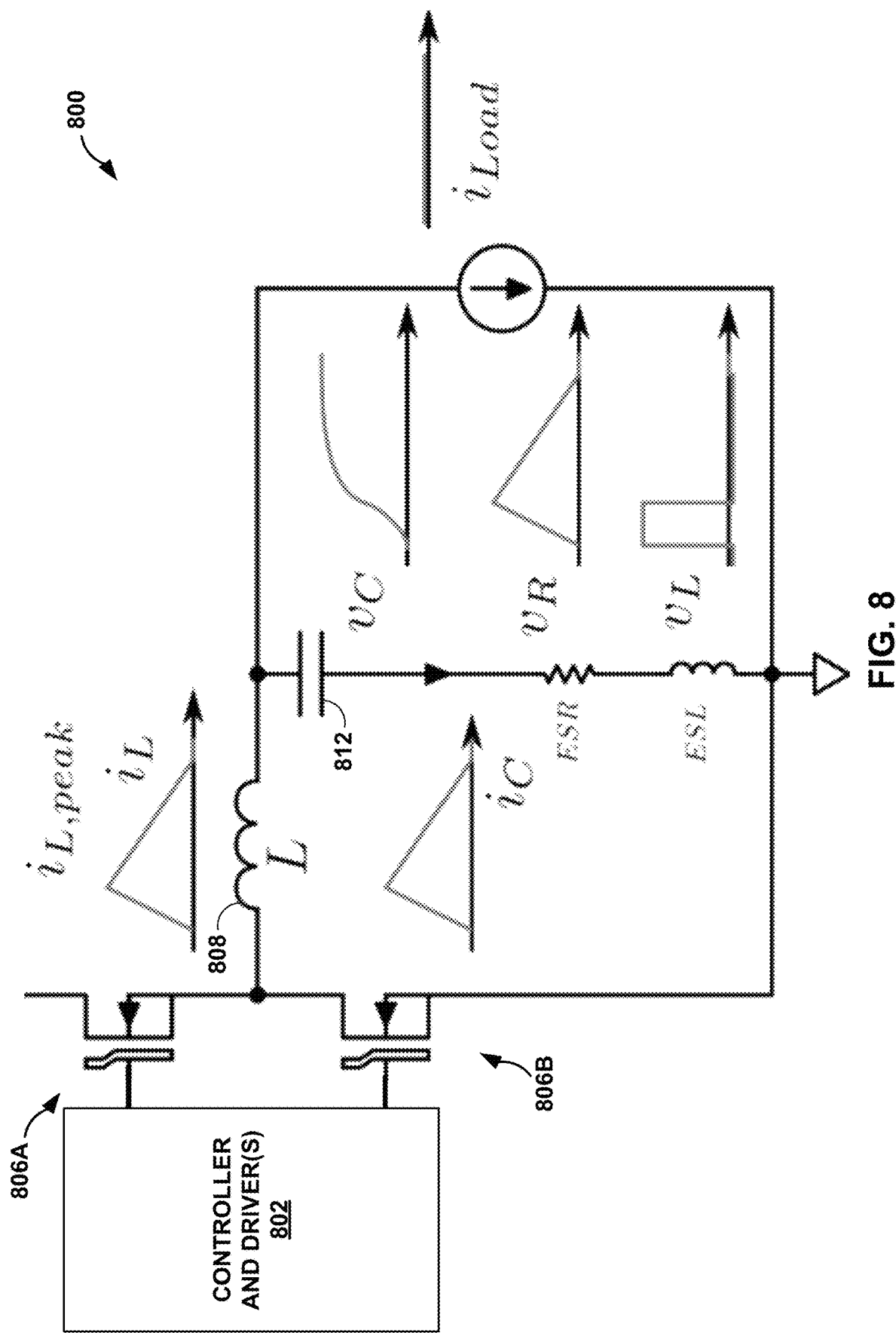
FIG. 8 is a block and circuit diagram of an example power converter system with current and voltage waveforms, in accordance with the techniques of this disclosure.

FIG. 8 is a block and circuit diagram of an example power converter system 800 with current and voltage waveforms, in accordance with the techniques of this disclosure. Power converter system 800 includes controller and driver(s) 802, switches 806A and 806B, inductor 808, and capacitor 812. The techniques of this disclosure may help with the control of output noise. Output noise can be divided into two main aspects, where the first aspect is linked to the ripple due to current injected into the output capacitor 812. Output capacitor 812 may be configured to absorb the higher current coming from inductor 808 and, in other phases, to deliver the current to a load. The second aspect of output noise is linked to the parasitics present in path of the output voltage or in output capacitor 812 itself; and inductive parasitics may lead to an inductive voltage divider between the switch node voltage and the output.

The output voltage is the sum of the voltages v_C, v_L, v_R shown in FIG. 8. As an example, inductor 808 may have an inductance of twenty-two nanohenries, capacitor 812 may have a capacitance of sixty-six microfarads, the equivalent series resistance (ESR) of capacitor 812 may be ten milliohms, and the equivalent series inductance (ESL) of capacitor 812 may be four hundred picohenries. The input and output voltages of power converter system 800 may be forty volts and 3.3 volts, respectively. The peak current can be controlled to i_L,peak which can be one ampere, and the assumption that the load current is low enough to be negligible in respect to the peak current.

$$v_R = i_{L,peak} ESR = 1*10 \text{ m} = 10 \text{ mV} \tag{1}$$

$$v_L = ESL \frac{di_L}{dt} = ESL \frac{v_{in} - v_{out}}{L} = 0.4n \frac{40-3.3}{2.2u} \sim 8 \text{ mV} \tag{2}$$

$$\frac{1}{2} C v_{out,f}^2 = \frac{1}{2} L i_{L,peak}^2 + \frac{1}{2} C v_{out,i}^2 \tag{3}$$

$$v_{out,f} = \sqrt{\frac{L i_{L,peak}^2 + C v_{out,i}^2}{C}} = \sqrt{\frac{2.2u\, 1^2 + 66u\, 3.3^2}{66u}} \tag{4}$$

$$\frac{\Delta v_{out}}{2} \sim 2.5 \text{ mV} \tag{5}$$

The visible weight of each contribution is shown in Equations (1)-(5). The main contribution is linked to ESR, which can be reduced by reducing the peak current. The second contributor is due to ESL which can be reduced by increasing the inductance of inductor 808 or reducing the ESL, while the contribution of the capacitance of capacitor 812 may be the most negligible. In examples in which a fixed minimum on-time (e.g., sixty nanoseconds) is used, the i_L,peak with Equation (6).

$$i_{L,peak} = \frac{v_{in} - v_{out}}{L} t_{on,min} = \begin{cases} 0.28 \text{ A}, & v_{in} = 13.5 \text{ V} \\ 1 \text{ A}, & v_{in} = 40 \text{ V} \end{cases} \tag{6}$$

Table II summarizes the results in the following noise performances. The peak current could be equal to the imposed current, but more likely a higher peak current could be chosen.

TABLE II

Noise (Δv) based on input voltage

| | Δv_out_new [mV] | Δv_out_ton_min [mV] |
|---|---|---|
| Vin = 13.5 | 14 | 4.8 |
| Vin = 40 | 20.5 | 20.5 |

One potential advantage of the techniques of this disclosure is the control of the output noise by controlling the peak current independently of the input voltage and the PWM switching frequency. To reduce noise, it may be beneficial to use the minimum on-time at the cost of lower efficiency. By controlling the peak current threshold using a pedestal circuit, the controller may be configured to also control the amount of ripple in the output voltage because there is a certain charge injected into the capacitor and a certain drop generated by the resistor.

Figure 9:
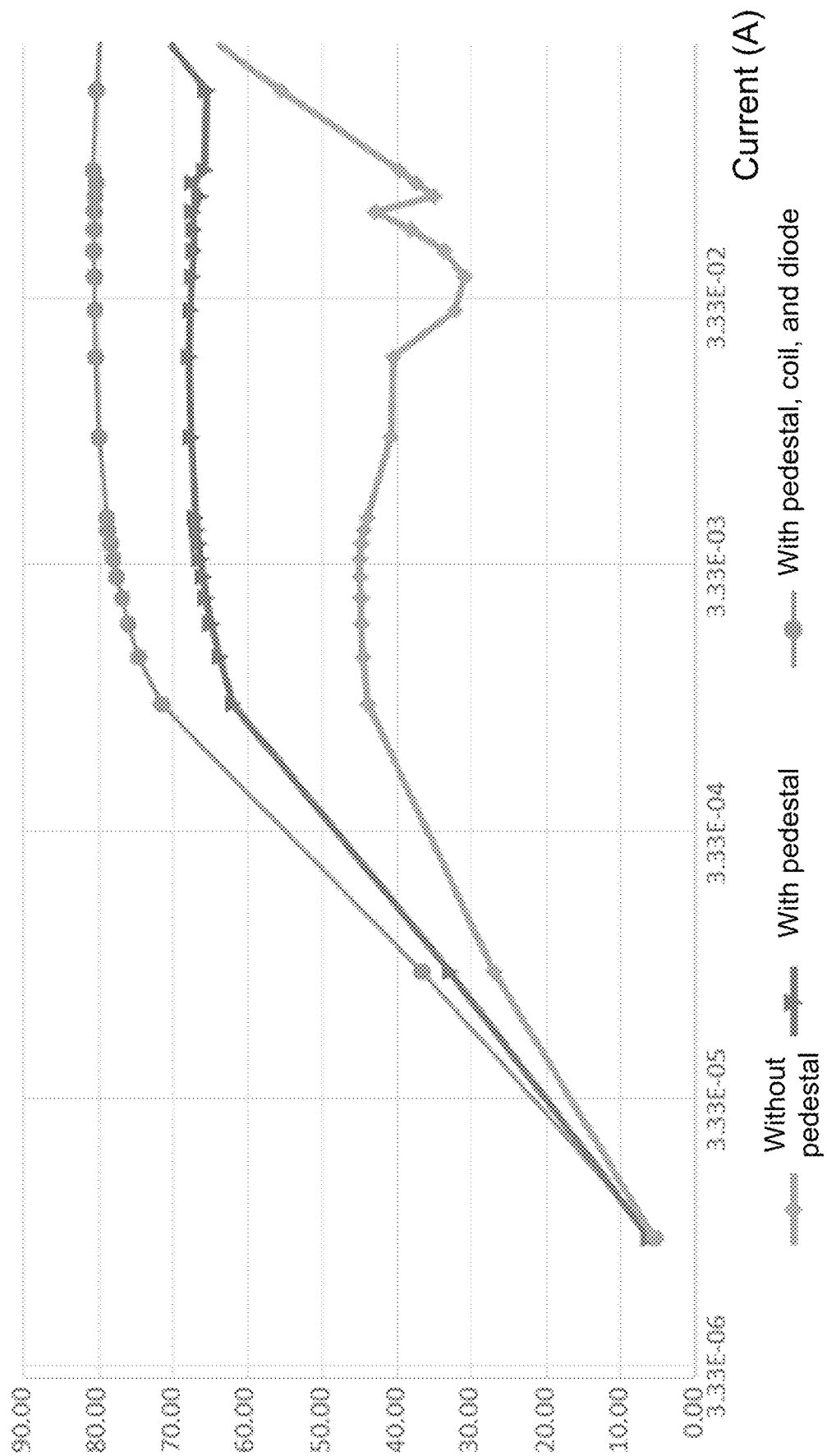
FIG. 9 is a graph of the efficiencies of example power converter systems, in accordance with the techniques of this disclosure.

FIG. 9 is a graph of the efficiencies of example power converter systems, in accordance with the techniques of this disclosure. In the example shown in FIG. 9, it is possible to increase the efficiency from 44% without a pedestal circuit at one milliampere to 62% with a pedestal circuit. It is also possible to achieve a target efficiency of 70% by modifying the materials and components used in the system to increase the amount of energy delivered at the output. For example, a Schottky diode may be added in parallel to the low side switch due to internal logic behavior, and an inductor coil.

Figure 10:
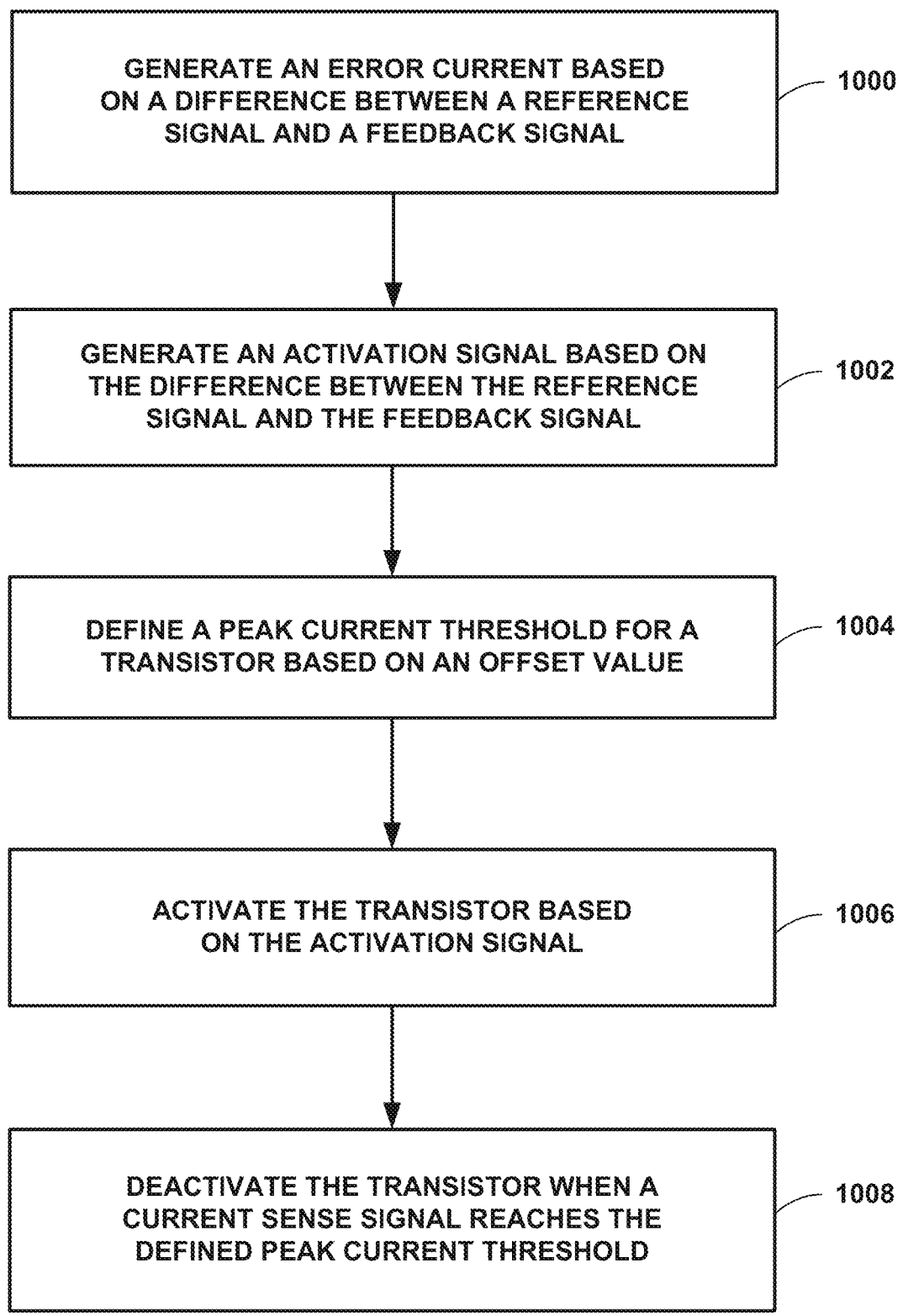
FIG. 10 is a flow diagram illustrating example techniques for generating a control signal for a power converter, in accordance with the techniques of this disclosure.

FIG. 10 is a flow diagram illustrating example techniques for generating a control signal for a power converter, in accordance with the techniques of this disclosure. The circuitry shown in FIG. 2 will be described as performing the techniques of the example shown in FIG. 10, but other components, devices, and systems (e.g., controllers 102 and 802) may perform similar functionality in other examples.

In the example shown in FIG. 10, amplifiers 218 and 242 generate error current 272 based on a difference between reference voltage 290 and a feedback signal received from sensor 214 (1000). Error amplifier 218 can generate compensation voltage 240 based on the difference between reference voltage 290 and the feedback signal. Amplifier 242 can generate error current 272 based on compensation voltage 240. Thus, amplifiers 218 and 242 together may be referred to as a first circuit configured to generate an error current. Amplifiers 218 and 242 may also be referred to as an error amplifier and compensation circuit.

Frequency generator 232 generates an activation signal based on the difference between reference voltage 290 and the feedback signal received from sensor 214 (1002). Amplifier 242 may be configured to generate ramp signal 280 based on compensation voltage 240, which is generated by error amplifier 218. Amplifier 242 may include a node for outputting ramp signal 280 that is separate from the node for outputting error current 272. Based on ramp signal 280, ramp circuit 230 generates hold signal 282. Frequency generator 232 can generate the activation signal based on hold signal 282.

In the example shown in FIG. 10, pedestal circuit 246 defines a peak current threshold for the transistor based on an offset value (1004). Pedestal circuit 246 may establish the offset value by generating and delivering a current to node 222. The current delivered by pedestal circuit 246 to node 222 may have the same polarity as error current 272 and an opposite polarity of slope compensation signal 274 and current sense signal 276. The peak current threshold may be defined by the pedestal current, error current 272, and in some examples, slope compensation signal 274.

Logic circuit 226 activates the transistor (e.g., via a driver) based on the activation signal received from frequency generator 232 (1006). Logic circuit 226 also deactivates the transistor (e.g., via a driver) when current sense signal 276 reaches the defined peak current threshold (1008). Current sense signal 276 may represent (e.g., be a scaled down version of) the current through the high-side switch. Peak detection comparator 224 may be configured to output a deactivation signal based on a comparison of the current received from node 222 and the current received from reference current source 248. Logic circuit 226 controls the transistor based on the signal received from peak detection comparator 224.

This disclosure has attributed functionality to controllers 102, 202, and 802 and logic circuit 212, each of which may include processing circuitry such as one or more processors. Controllers 102, 202, and 802 and logic circuit 212 may include any combination of integrated circuitry, discrete logic circuity, analog circuitry, such as one or more microprocessors, digital signal processors (DSPs), application specific integrated circuits (ASICs), and/or field-programmable gate arrays (FPGAs). In some examples, controllers 102, 202, and 802 and logic circuit 212 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be encoded in instructions and data stored to a non-transitory computer-readable storage medium, such as memory associated with controllers 102, 202, and 802 and logic circuit 212. In this case, the instructions may be executed by one or more processors (e.g., controllers 102, 202, and 802 and logic circuit 212). Example non-transitory computer-readable storage media may include RAM, ROM, programmable ROM (PROM), erasable programmable ROM (EPROM), electronically erasable programmable ROM (EEPROM), flash memory, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

The following numbered aspects demonstrate one or more clauses of the disclosure.

Clause 1. A method for controlling a transistor in a power converter system includes generating, by an amplifier of a controller, an error current based on a difference between a reference signal and a feedback signal, wherein the feedback signal depends on an output voltage of the power converter system. The method includes generating, by a frequency generator of the controller, an activation signal based on the difference between the reference signal and the feedback signal. The method also includes defining, by a pedestal circuit of the controller, a peak current threshold for the transistor based on an offset value. The method further includes activating, by a logic circuit of the controller, the transistor based on the activation signal. The method includes deactivating, by the logic circuit, the transistor when a current sense signal reaches the defined peak current threshold, where the current sense signal is representative of a power current conducted by the transistor.

Clause 2. The method of the preceding clause, further including deactivating internal circuitry of the controller after a timeout from the last activation of the transistor.

Clause 3. The method of the preceding clause, further including implementing a delay in the activation signal when the internal circuitry has been deactivated.

Clause 4. The method of the preceding clauses or any combination thereof, further including defining the peak current threshold based on the offset value and by the error current.

Clause 5. The method of the preceding clauses or any combination thereof, where generating the activation signal includes generating the activation signal using a skip technique.

Clause 6. The method of the preceding clauses or any combination thereof, further including generating a compensation voltage based on a difference between the reference signal and the feedback signal.

Clause 7. The method of the preceding clauses or any combination thereof, further including generating the error current based on a compensation voltage that depends on a difference between the reference signal and the feedback signal.

Clause 8. The method of the preceding clauses or any combination thereof, where deactivating the transistor is in response to comparing current amplitudes at the first and second input nodes.

Clause 9. The method of the preceding clauses or any combination thereof, further including sinking, by the pedestal circuit, the first current generated by a current sense circuit.

Clause 10. The method of the preceding clauses or any combination thereof, where activating the transistor is in response to a low-to-high transition of the activation signal.

Clause 11. The method of the preceding clauses or any combination thereof, further including delivering three milliamperes to a load at an efficiency of greater than eighty-one percent.

Clause 12. A device for controlling a transistor in a power converter system includes a first circuit configured to generate an error current based on a difference between a reference signal and a feedback signal, where the feedback signal depends on an output voltage of the power converter system. The device also includes a frequency generator configured to generate an activation signal based on the difference between the reference signal and the feedback signal. The device further includes a pedestal circuit configured to define a peak current threshold for the transistor based on an offset value. The device also includes a logic circuit configured to activate the transistor based on the activation signal and deactivate the transistor when a current sense signal reaches the defined peak current threshold, where the current sense signal is representative of a power current conducted by the transistor.

Clause 13. The device of the preceding clause, where the controller is configured to perform the method of the preceding clauses or any combination thereof.

Clause 14. The device of any of the preceding clauses, further including an additional circuit configured to deactivate internal circuitry of the device after a timeout from the last activation of the transistor.

Clause 15. The device of any of the preceding clauses, where the frequency generator is configured to implement a delay in the activation signal when internal circuitry of the device has been deactivated.

Clause 16. The device of any of the preceding clauses, where the peak current threshold is defined by the offset value and by the error current.

Clause 17. The device of any of the preceding clauses, where the frequency generator is configured to generate the activation signal using a skip technique.

Clause 18. The device of any of the preceding clauses, further including an error amplifier configured to generate a compensation voltage based on a difference between the reference signal and the feedback signal.

Clause 19. The device of any of the preceding clauses, further including a transconductance amplifier configured to generate the error current based on the compensation voltage.

Clause 20. The device of any of the preceding clauses, further including a peak detection comparator including a first input node and a second input node, a current sense circuit coupled to the first input node, and a reference current source coupled to the second input node, where the first circuit is coupled to the first input node, the pedestal circuit is coupled to the first input node, and the peak detection comparator is configured to cause the logic circuit to deactivate the transistor in response to comparing current amplitudes at the first and second input nodes.

Clause 21. The device of clause 20, where the current sense circuit is configured to deliver a first current to the first input node, the first current having a first polarity relative to the first input node. The pedestal circuit is configured to deliver a second current to the first input node, the second current having a second polarity relative to the first input node, the second polarity being opposite the first polarity.

Clause 22. The device of clause 20 or clause 21, where the pedestal circuit is configured to act as a sink for the first current generated by the current sense circuit.

Clause 23. The device of clause 21 or clause 22, where the first circuit is configured to deliver the error current to the first input node, the error current having the second polarity relative to the first input node.

Clause 24. The device of clauses 21-23 or any combination thereof, further including a slope compensation circuit coupled to the first input node, where the slope compensation circuit is configured to deliver a third current to the first input node, the third current having the first polarity relative to the first input node.

Clause 25. The device of any of the preceding clauses, where the logic circuit is configured to activate the transistor in response to a low-to-high transition of the activation signal.

Clause 26. The device of any of the preceding clauses, where the pedestal circuit includes a current mirror configured to generate the offset value as a pedestal current.

Clause 27. The device of clause 26, where the pedestal circuit further includes a resistor, and the current mirror is configured to generate the pedestal current based on a fourth current through the resistor.

Clause 28. The device of any of the preceding clauses, where the switch is a high-side switch in a direct current/direct current (DC/DC) converter, and the DC/DC converter is configured to deliver three milliamperes to a load at an efficiency of greater than eighty-one percent.

Clause 29. A power converter system includes a transistor, a driver configured to activate or deactivate the transistor, and a controller including a first circuit configured to generate an error current based on a difference between a reference signal and a feedback signal. The feedback signal depends on an output voltage of the power converter system. The controller also includes a frequency generator configured to generate an activation signal based on the difference between the reference signal and the feedback signal. The controller further includes a pedestal circuit configured to define a peak current threshold for the transistor based on an offset value. The controller also includes a logic circuit configured to cause the driver to activate the transistor based on the activation signal and cause the driver to deactivate the transistor when a current sense signal reaches the defined peak current threshold, where the current sense signal is representative of a power current conducted by the transistor.

Clause 30. The system of the preceding clause, where the controller is configured to perform the method of the preceding clauses or any combination thereof.

Clause 31. A system including means for performing the method of the preceding clauses or any combination thereof.

Clause 32. A device including a computer-readable medium having executable instructions stored thereon, configured to be executable by processing circuitry for causing the processing circuitry to perform the method of the preceding clauses or any combination thereof.

Various examples of the disclosure have been described. Any combination of the described systems, operations, or functions is contemplated. These and other examples are within the scope of the following claims.

What is claimed is:

1. A device for controlling a transistor in a power converter system, the device comprising:
   a first circuit configured to generate an error current based on a difference between a reference signal and a feedback signal, wherein the feedback signal depends on an output voltage of the power converter system;
   a frequency generator configured to generate an activation signal based on the difference between the reference signal and the feedback signal;
   a pedestal circuit configured to define a peak current threshold for the transistor based on an offset value; and
   a logic circuit configured to:
      activate the transistor based on the activation signal; and
      deactivate the transistor when a current sense signal reaches the defined peak current threshold, wherein the current sense signal is representative of a power current conducted by the transistor,
   wherein the transistor is a high-side switch in a direct current/direct current (DC/DC) converter, and
   wherein the DC/DC converter is configured to deliver three milliamperes to a load at an efficiency of greater than eighty-one percent.

2. The device of claim 1, further comprising an additional circuit configured to deactivate internal circuitry of the device after a timeout from the last activation of the transistor.

3. The device of claim 2, wherein the frequency generator is configured to implement a delay in the activation signal when the internal circuitry has been deactivated.

4. The device of claim 1, wherein the peak current threshold is defined by the offset value and by the error current.

5. The device of claim 1, wherein the frequency generator is configured to generate the activation signal using a skip technique.

6. The device of claim 1, wherein the first circuit comprises:
   an error amplifier configured to generate a compensation voltage based on a difference between the reference signal and the feedback signal; and
   a transconductance amplifier configured to generate the error current based on the compensation voltage.

7. The device of claim 1, further comprising:
   a peak detection comparator comprising a first input node and a second input node;
   a current sense circuit coupled to the first input node; and
   a reference current source coupled to the second input node,
   wherein the first circuit is coupled to the first input node,
   wherein the pedestal circuit is coupled to the first input node,
   wherein the peak detection comparator is configured to cause the logic circuit to deactivate the transistor in response to comparing current amplitudes at the first and second input nodes.

8. The device of claim 7,
   wherein the current sense circuit is configured to deliver a first current to the first input node, the first current having a first polarity relative to the first input node, and
   wherein the pedestal circuit is configured to deliver a second current to the first input node, the second current having a second polarity relative to the first input node, the second polarity being opposite the first polarity.

9. The device of claim 8, wherein the first circuit is configured to deliver the error current to the first input node, the error current having the second polarity relative to the first input node.

10. The device of claim 8, further comprising a slope compensation circuit coupled to the first input node,
    wherein the slope compensation circuit is configured to deliver a third current to the first input node, the third current having the first polarity relative to the first input node.

11. The device of claim 1, wherein the pedestal circuit is configured to act as a sink for the first current generated by the current sense circuit.

12. The device of claim 1, wherein the logic circuit is configured to activate the transistor in response to a low-to-high transition of the activation signal.

13. The device of claim 1, wherein the pedestal circuit comprises a current mirror configured to generate the offset value as a pedestal current.

14. The device of claim 13,
    wherein the pedestal circuit further comprises a resistor, and
    wherein the current mirror is configured to generate the pedestal current based on a fourth current through the resistor.

15. A power converter system comprising:
    a transistor;
    a driver configured to activate or deactivate the transistor; and
    a controller comprising:
       a first circuit configured to generate an error current based on a difference between a reference signal and a feedback signal, wherein the feedback signal depends on an output voltage of the power converter system;
       a frequency generator configured to generate an activation signal based on the difference between the reference signal and the feedback signal;
       a pedestal circuit configured to define a peak current threshold for the transistor based on an offset value; and a logic circuit configured to:
    cause the driver to activate the transistor based on the activation signal; and
    cause the driver to deactivate the transistor when a current sense signal reaches the defined peak current threshold, wherein the current sense signal is representative of a power current conducted by the transistor,
wherein the controller further comprises:
a peak detection comparator comprising a first input node and a second input node;
a current sense circuit coupled to the first input node; and
a reference current source coupled to the second input node,
wherein the first circuit is coupled to the first input node,
wherein the pedestal circuit is coupled to the first input node, and
wherein the peak detection comparator is configured to cause the driver to deactivate the transistor in response to comparing current amplitudes at the first and second input nodes.

16. The system of claim 15,
wherein the current sense circuit is configured to deliver a first current to the first input node, the first current having a first polarity relative to the first input node, and
wherein the pedestal circuit is configured to deliver a second current to the first input node, the second current having a second polarity relative to the first input node, the second polarity being opposite the first polarity.

17. The system of claim 15,
wherein the pedestal circuit comprises a current mirror configured to generate the offset value as a pedestal current,
wherein the pedestal circuit further comprises a resistor, and
wherein the current mirror is configured to generate the pedestal current based on a third current through the resistor.

18. A method for controlling a transistor in a power converter system, the method comprising:
    generating, by an amplifier of a controller, an error current based on a difference between a reference signal and a feedback signal, wherein the feedback signal depends on an output voltage of the power converter system;
    generating, by a frequency generator of the controller, an activation signal based on the difference between the reference signal and the feedback signal;
    defining, by a pedestal circuit of the controller, a peak current threshold for the transistor based on an offset value;
    activating, by a logic circuit of the controller, the transistor based on the activation signal; and
    deactivating, by the logic circuit, the transistor when a current sense signal reaches the defined peak current threshold, wherein the current sense signal is representative of a power current conducted by the transistor,
    wherein the transistor is a high-side switch in a direct current/direct current (DC/DC) converter, and
    wherein the DC/DC converter is configured to deliver three milliamperes to a load at an efficiency of greater than eighty-one percent.

19. A device for controlling a transistor in a power converter system, the device comprising:
    a first circuit configured to generate an error current based on a difference between a reference signal and a feedback signal, wherein the feedback signal depends on an output voltage of the power converter system;
    a frequency generator configured to generate an activation signal based on the difference between the reference signal and the feedback signal;
    a pedestal circuit configured to define a peak current threshold for the transistor based on an offset value; and
    a logic circuit configured to:
        activate the transistor based on the activation signal; and
        deactivate the transistor when a current sense signal reaches the defined peak current threshold, wherein the current sense signal is representative of a power current conducted by the transistor,
    wherein the device further comprises:
    a peak detection comparator comprising a first input node and a second input node;
    a current sense circuit coupled to the first input node; and
    a reference current source coupled to the second input node,
    wherein the first circuit is coupled to the first input node,
    wherein the pedestal circuit is coupled to the first input node,
    wherein the peak detection comparator is configured to cause the logic circuit to deactivate the transistor in response to comparing current amplitudes at the first and second input nodes.

20. A device for controlling a transistor in a power converter system, the device comprising:
    a first circuit configured to generate an error current based on a difference between a reference signal and a feedback signal, wherein the feedback signal depends on an output voltage of the power converter system;
    a frequency generator configured to generate an activation signal based on the difference between the reference signal and the feedback signal;
    a pedestal circuit configured to define a peak current threshold for the transistor based on an offset value; and
    a logic circuit configured to:
        activate the transistor based on the activation signal; and
        deactivate the transistor when a current sense signal reaches the defined peak current threshold, wherein the current sense signal is representative of a power current conducted by the transistor,
    wherein the pedestal circuit comprises a current mirror configured to generate the offset value as a pedestal current,
    wherein the pedestal circuit further comprises a resistor, and
    wherein the current mirror is configured to generate the pedestal current based on a fourth current through the resistor.

* * * * *